(12) United States Patent
Kurth et al.

(10) Patent No.: US 6,658,818 B2
(45) Date of Patent: Dec. 9, 2003

(54) PROCESS AND MACHINE FOR DIVIDING A MULTI-LAYERED WEB UTILIZED IN ASEPTIC PACKAGING INTO A PLURALITY OF INDIVIDUAL WEBS OF EQUAL WIDTH

(75) Inventors: Gunter Kurth, Ranstadt (DE); Kay Loth, Echzell (DE)

(73) Assignee: Hassia Verpackungsmaschinen GmbH, Ranstadt (DE)

( * ) Notice: Subject to any disclaimer, the term of this patent is extended or adjusted under 35 U.S.C. 154(b) by 0 days.

(21) Appl. No.: 10/062,610

(22) Filed: Feb. 2, 2002

(65) Prior Publication Data

US 2002/0104290 A1 Aug. 8, 2002

(30) Foreign Application Priority Data

Feb. 3, 2001 (DE) .......................... 101 04 858
Oct. 15, 2001 (DE) .......................... 101 50 334

(51) Int. Cl.$^7$ .................... B65B 41/00; B65B 55/04; B31B 1/14
(52) U.S. Cl. .................... 53/426; 53/451; 53/389.3; 53/389.4; 493/361; 493/369; 493/34
(58) Field of Search ................. 493/361, 362, 493/363, 365, 366, 367, 369, 20, 34; 53/426, 450, 451, 389.1, 389.2, 389.3, 389.4; 219/121.69

(56) References Cited

U.S. PATENT DOCUMENTS

| 3,148,824 A | * | 9/1964 | Foster ................. 493/363 |
| 4,160,894 A | * | 7/1979 | Stemmler et al. ........ 493/340 |
| 4,325,897 A | * | 4/1982 | Zerle et al. ............ 264/410 |
| 4,656,813 A | * | 4/1987 | Baldini et al. ........... 53/451 |
| 5,133,235 A | * | 7/1992 | DeVito ................. 493/367 |
| 5,158,499 A | * | 10/1992 | Guckenberger ......... 206/524.2 |
| 5,630,308 A | * | 5/1997 | Guckenberger ........... 53/412 |
| 5,711,470 A | * | 1/1998 | Thompson ............... 226/4 |
| 5,971,905 A | * | 10/1999 | Fukuda ................ 493/34 |
| 6,324,815 B2 | * | 12/2001 | Brollier et al. ........... 53/426 |
| 6,358,347 B1 | * | 3/2002 | Thornton et al. ....... 219/121.69 |

FOREIGN PATENT DOCUMENTS

| DE | 19636492 C1 | * | 11/1997 |
| EP | 0719634 A2 | * | 7/1996 |

* cited by examiner

Primary Examiner—John Sipos
Assistant Examiner—Louis Huynh
(74) Attorney, Agent, or Firm—Collard & Roe, P.C.

(57) ABSTRACT

A system of dividing an endless, wide multi-layered web of packing material into a plurality of individual webs of equal width and aseptically processing the individual webs comprises laser-cutting elongated slits into the endless wide multi-layered web at a distance corresponding to the width of the individual webs to produce the individual webs, the slits extending through all layers of the web except for a web layer remote from the laser, which is only notched at least at selected distances, whereby the notched remote web layer holds the individual webs together, then sterilizing the laser-cut multi-layered web in a sterilization station, and conveying the sterilized, laser-cut multi-layered web in a sterile chamber to a number of tube-shaping elements corresponding to the number of individual webs, the notched remote web layer being torn by the tube-shaping elements to separate the individual webs from each other.

13 Claims, 4 Drawing Sheets

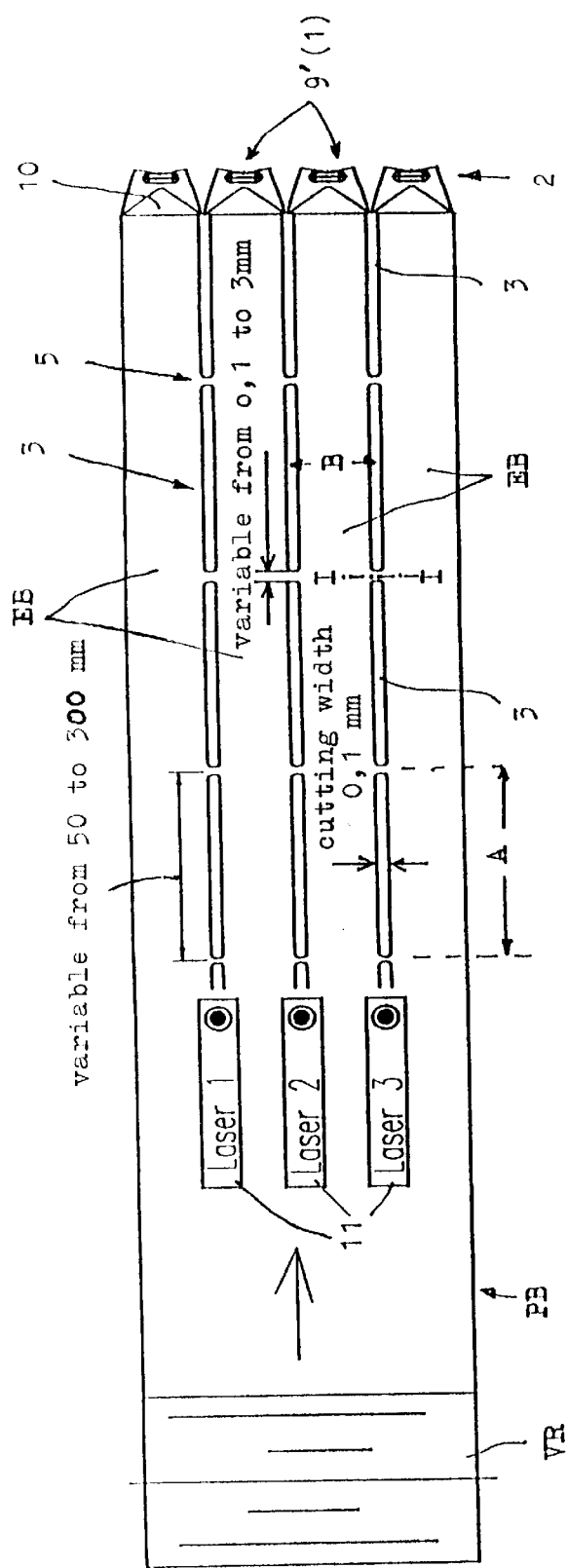
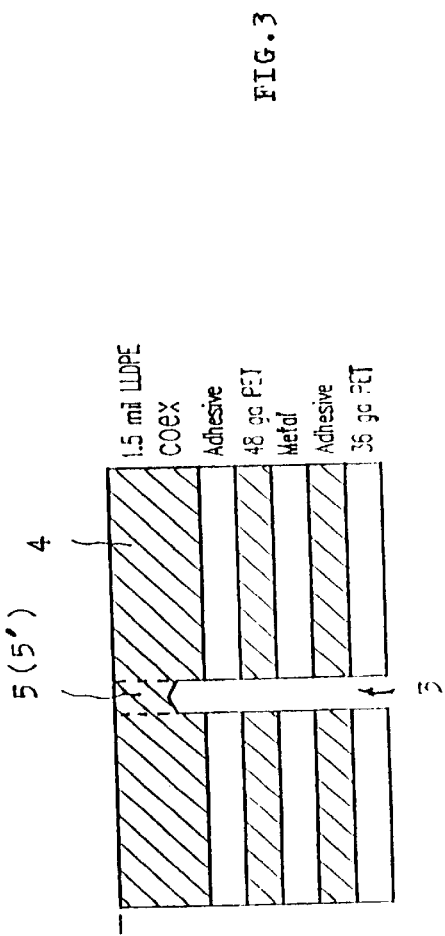
FIG. 2
FIG. 3

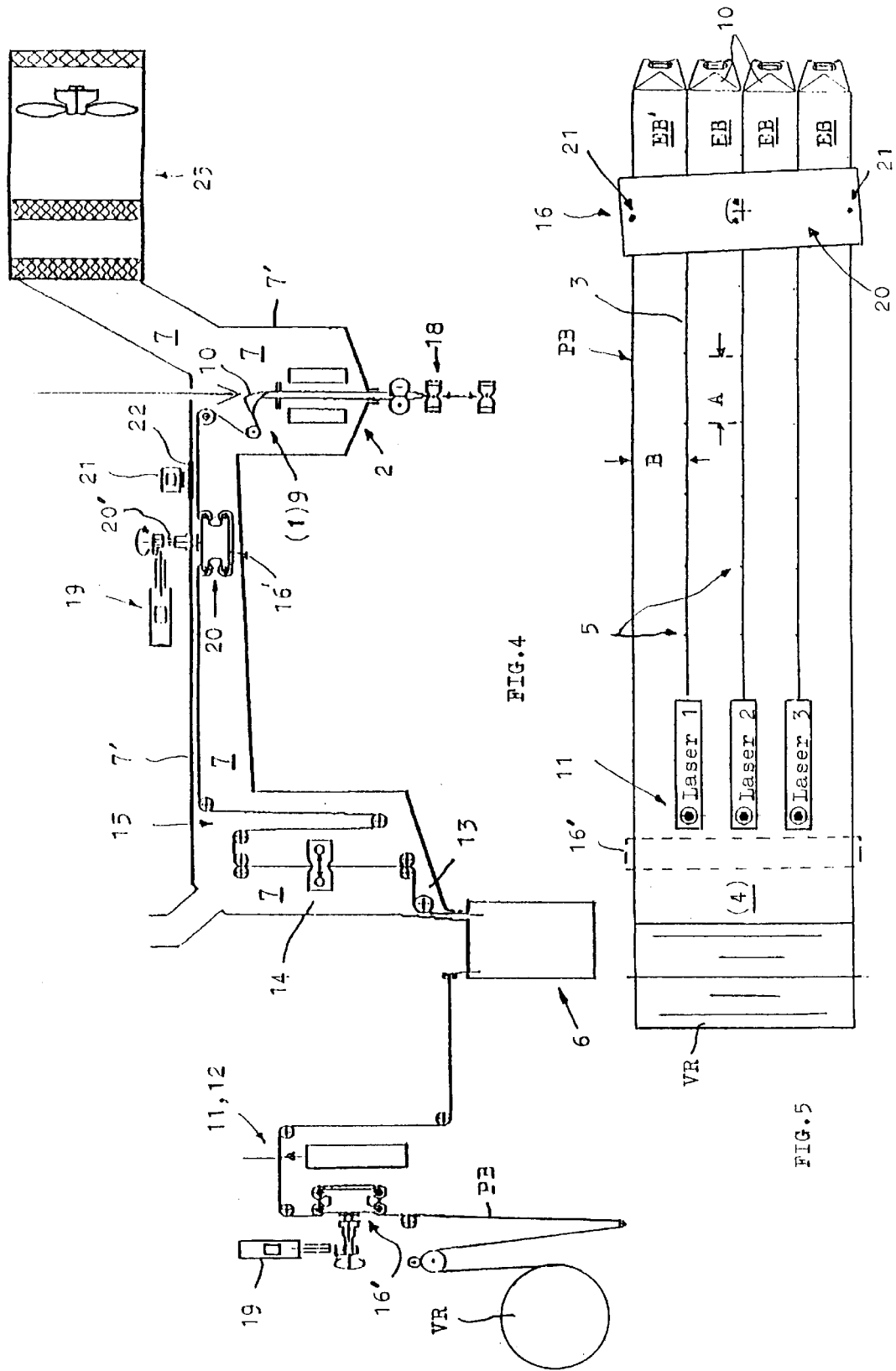

PROCESS AND MACHINE FOR DIVIDING A MULTI-LAYERED WEB UTILIZED IN ASEPTIC PACKAGING INTO A PLURALITY OF INDIVIDUAL WEBS OF EQUAL WIDTH

BACKGROUND OF THE INVENTION

1. Field of the Invention

The present invention relates to a process of dividing an endless, wide multi-layered web of packing material into a plurality of individual webs of equal width, and aseptically processing the individual webs by supplying the webs to a forming and filling station of a tubular bag packaging machine where the individual webs are formed into individual packages, filled, sealed and singled. It also relates to tubular bag packaging machine utilizing such a process.

2. Description of the Prior Art

For economically manufacturing tubular bags, it is known to slit a sheet of packing material into a plurality of strips of equal width, advancing the individual strips to a variety of shaping and filing pipes arranged in parallel with respect to one another, through suitable molding or shaping elements. The multiple lengthwise separation of the web of packing material is effected by longitudinal cutters provided ahead of the forming and filling pipes. This prior art method is exemplified by European Patent Application 0 719 634 A2. It is absolutely satisfactory in operation and requires no further explanation. To the extent that the web of packing material is a one-layered foil material, this method can be carried out also aseptically or on a tubular bag packaging machine designed for aseptic operation, wherein the web of packing material initially is subjected to a sterilization process and introduced immediately thereafter into a sterile chamber in the end region of which the longitudinal cutters and the shaping and loading pipes and their appertaining elements (shaping shoulders and foil-strip forming elements, lengthwise sealing tools) are also under sterile conditions.

However, this method cannot be readily employed if extremely high requirements are placed upon the preservation of the sterile condition, and if multi-layered packing material, i.e. laminated foil, is to be utilized. The layers of laminates are joined by adhesives during manufacture. As the application of such adhesives is not under aseptic conditions, the ingress of micro-organisms or germs in such laminated material cannot be prevented from occurring, which, during slitting the sheet of packing material into a plurality of individual webs of equal width, can be released in the area of the cutting edges. Nevertheless, this does not yet present the actual problem to be solved as it is readily possible to slit the web of packing sheet into individual webs prior to sterilization and to lead the individual webs through the sterilization station, thereby also reaching the germ-containing cutting edges of the individual webs and thus avoiding a re-contamination of the sterile chamber. However, at this point, the actual problem is encountered for it has proved to be extremely difficult and complex, if not impossible, to guide the individual webs which, as a rule, are relatively narrow, precisely through the comparatively extended sterile path of conveyance. In fact, such a guidance of the individual webs, in practice, is not realizable to secure a safe and smooth operation of a tubular bag packing machine. In addition, tensions are set free in the web of packing material during cutting, which are likely to result in an uncontrolled lateral edge pattern of the individual webs, rectification of which, in the path of conveyance, is impossible or would involve unreasonably high costs, as each individual web would have to be held under guiding control.

It is, therefore, an object of the invention so to design a tubular bag packing machine system as to insure sterilization also of the exposed longitudinal cutting edges of a multi-layered web of packing material lengthwise cut into a plurality of individual webs.

Another object of the invention resides in assuring that the advance in parallel of the individual webs within the machine to the shaping and loading station be carried out smoothly and without involving any additional efforts.

Moreover, it is an object of the invention to provide a suitable process enabling, in an easy way, both a sterilization of the cutting edges of the individual webs and a substantially precise guidance of the packing material cut lengthwise, down to the forming elements.

The above and other objects are accomplished according to one aspect of the invention with a process of dividing an endless, wide multi-layered web of packing material into a plurality of individual webs of equal width, and aseptically processing the individual webs by supplying the webs to a forming and filling station of a tubular bag packaging machine where the individual webs are formed into individual packages, filled, sealed and singled, which comprises the steps of laser-cutting elongated slits into the endless wide multi-layered web at a distance corresponding to the width of the individual webs to produce the individual webs, the slits extending through all layers of the web except for a web layer remote from the laser, which is only notched at least at selected distances, whereby the notched remote web layer holds the individual webs together, then sterilizing the laser-cut multi-layered web in a sterilization station, and conveying the sterilized, laser-cut multi-layered web in a sterile chamber to a number of tube-shaping and filling elements corresponding to the number of individual webs, the notched remote web layer being torn by the tube-shaping elements to separate the individual webs from each other.

According to one embodiment, the remote web layer is only notched along the entire length of the multi-layered web so that the entire notched or scored remote web layer holds the individual webs together.

According to another embodiment, the remote web layer is scored only at selected distances along the length of the multi-layered web to provide readily breakable bridges at these distances while the elongated slits extend through the remote web layer between the readily breakable bridges, in which case only the bridges hold the individual webs together.

According to another aspect of this invention, there is provided a tubular bag packaging machine for aseptically processing individual webs of a packing material by forming the individual webs into individual packages in a forming and filling station, where they are filled, sealed and singled in a sterile chamber, the forming and filling station including a number of tube-shaping and filling elements corresponding to the number of individual webs, which machine comprises a supply reel of an endless, wide multi-layered web of packing material, a sterilization station arranged upstream of the forming and filling station for sterilizing the web of packing material, and a conveyance path along which the endless, wide multi-layered web of packing material is conveyed from the supply reel to the sterilization station. A number of lasers corresponding to the number of tube-shaping elements minus one are arranged in the conveyance path for cutting elongated slits into the multi-layered web to divide the web into the individual webs. Means for controlling the lasers determine the depth and the length of the slits.

The whole problem is thereby solved in a simple and at the same time elegant way in that the multi-layered web or laminated sheet of packing material is cut lengthwise, prior to sterilization, but only to the extent that, on the one hand, merely a perforation or score is formed which subsequently will break easily, and, on the other hand, the web structure is still joined together to enable it to be readily conveyed and guided. The complete separation of the web of packing material into individual webs arises automatically directly ahead of the forming pipes because the adaptation of the individual webs to the tubular shape of the pipe breaks the scored remote web layer.

The feature of "only notching the layer of the web of packing material remote from the laser" will insure that in this area, too, all separating planes in the laminated foil are notched or scored to safeguard sterilization, while the scoring will easily break by lateral tensile stress. If the remote web layer is cut through, except for the scored bridges at selected distances, the slit lengths correspond to a multiple of the bridge widths, and the bridge widths and the slit lengths can be readily varied by a corresponding laser control in conformity with the layer material, the number of layers of the laminated sheet being variable.

Controllable lasers permitting or enabling such special scoring in the longitudinal direction are known and commercially available. It is common practice to utilize such lasers in the technical field of direct interest, yet in a completely different field of application, i.e. for providing attenuation lines or tear-off aids, as shown, for example, in DE-A-196 36 429 C1 and U.S. Pat. Nos. 5,158,499 and 5,630,308.

Since the individual webs in the practice of the invention are no longer fed to the shaping elements in a condition already separated but rather in a condition still joined together by the scored remote web layer, it will be necessary to insure that the individual webs still joined together move toward their tube-shaping elements, which include the so-called shaping shoulders of the forming pipes, in a substantially centered direction.

According to an advantageous feature, the web of packing material containing the individual webs still joined together is subjected to a web edge control for centering the individual webs with respect to their given tube-shaping elements in the sterile chamber, prior to their being fed toward the tube-shaping elements. For this purpose, the machine is provided with web edge control elements ahead of the forming pipes. It is advantageous to arrange the adjusting elements for the web guide contained in the sterile chamber outside the sterile chamber, including optoelectronic edge sensors on view windows of the sterile chamber. This is done in consideration of the required pre-sterilization of the sterile chamber upon placing a packaging machine of this type into operation to prevent, to the highest degree possible, the formation of hidden germs which are difficult to be reached by the introduced sterilizing agent.

Similarly, it has proved advantageous also to provide a web edge control, as known in packaging machine engineering, ahead of the laser cutting station, i.e. between the latter and the supply reel from which the web of packing material is withdrawn. Such a web edge control not contained in the sterile chamber insures, in an advantageous way, that the web of packing material discharged from the reel advances toward the laser in a manner already correctly guided in the central direction, thereby safeguarding that the longitudinal laser cuts result in substantially identical widths of the individual webs.

Further features, advantages and objects of the invention will become more apparent from the ensuing detailed description of now preferred embodiments taken in conjunction with the appended schematic drawings.

BRIEF DESCRIPTION OF THE DRAWINGS

FIG. 1A is a schematically shown, enlarged elevational view of the machine according to FIG. 1 in the direction of arrow P;

FIG. 2 is a highly schematized plan view of a web of packing material divided into four individual webs, along with associated lasers and shaping stations;

FIG. 3 is a greatly enlarged sectional view taken along the line II—II in FIG. 2;

FIG. 4 is a side view substantially corresponding to FIG. 1 of another embodiment;

FIG. 5 is a highly schematized plan view of the web of packing material, divided into four single webs, in the machine of FIG. 4;

DESCRIPTION OF THE PREFERRED EMBODIMENTS

Figure 1:
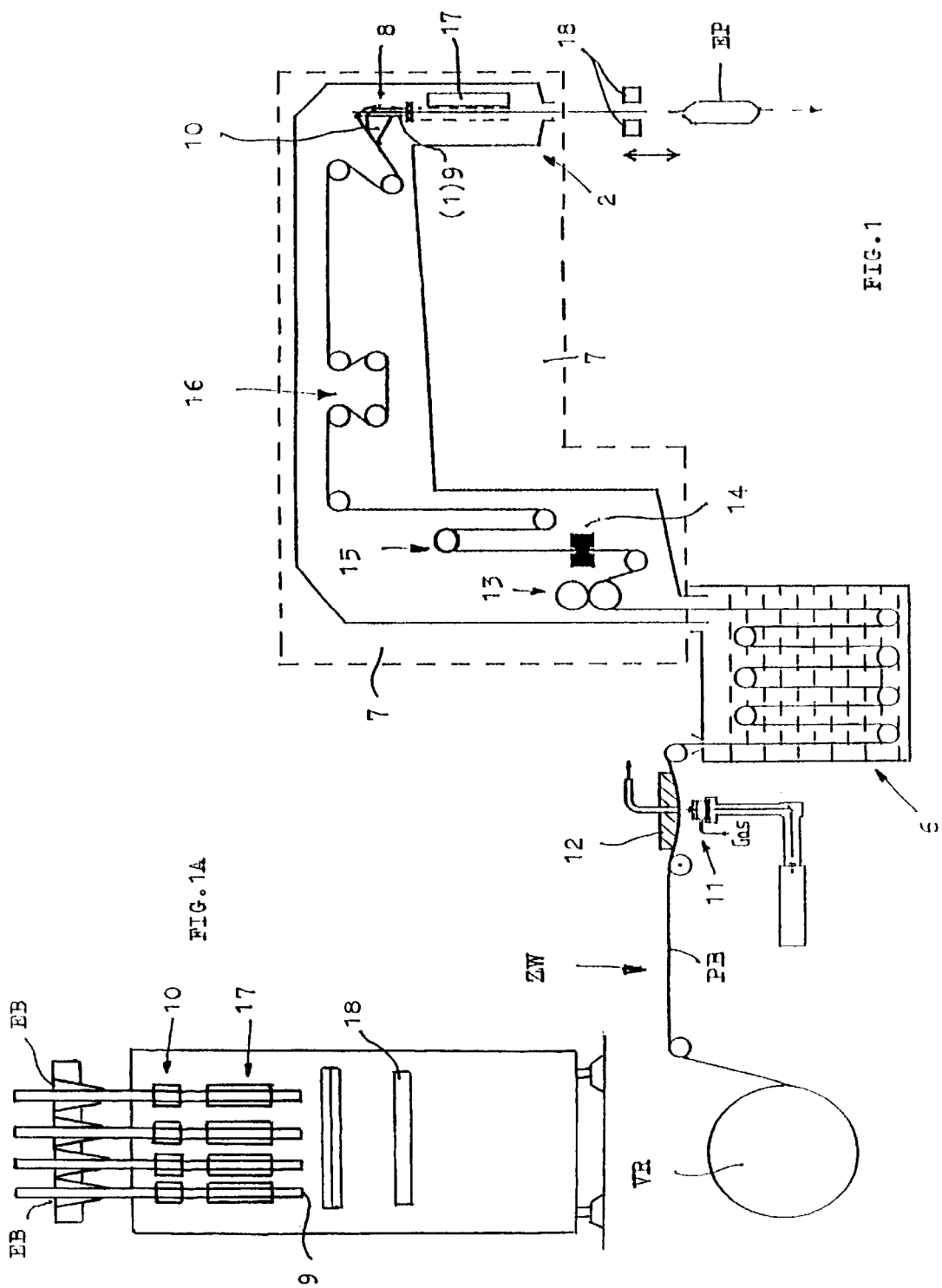
FIG. 1 is a side view of one embodiment of an septically operating tubular bag packaging machine.

Referring to the drawings, FIGS. 1 and 1A schematically show, by way of example, a generally known type of a tubular bag packaging machine comprising a sterilizing station 6 and a sterile chamber 7 provided therebehind, in the end 8 of which are arranged tube-shaping elements 1, i.e. forming pipes 9 and elements 10, which preferably have shaping shoulders, for forming individual tubular bags or pouches.

In the manufacture of bags or pouches of the three-sided-sealed-edge-type, each forming pipe 9 is replaced by a pair of forming pipes 9', as shown in the embodiment according to FIG. 2 (extreme right), comprising the forming and filling station 2. Accordingly, in the machine according to FIGS. 1 and 2, the web of packing material PB withdrawn from the supply reel VR must be divided into four individual webs EB.

In respect of a tubular bag packaging machine of this type it is important, for realizing the process substantially described hereinbefore, to dispose a plurality of lasers 11, corresponding to the number of forming tubes less one, in the supply path ZW of the web of packing material PB ahead of the sterilization station 6 of the packaging machine furnished with a plurality of forming pipes 9 or pairs of forming pipes 9' arranged in parallel in side-by-side relationship, with the lasers 11 being controllable relative to the cutting depth thereof.

In the embodiment according to FIG. 2, the multi-layered web of packing material PB withdrawn from the supply reel VR is divided lengthwise into four individual webs EB, in which case three lasers 11 are arranged at a distance corresponding to the width B of the individual web in side-by-side relationship underneath the web supplying path, as shown in FIG. 1.

The length of the perforated slits 3 can be between 50 mm and 300 mm with a cutting width of, for example, 0.1 mm, while the bridges 5 left in layer 4 disposed away from the laser (see FIG. 3) may have a length varying between 0.1 and 1 mm. FIG. 3 shows, in broken lines, an extremely enlarged transverse sectional view of bridges 5 in a multi-layered foil formed, for example, of a total of six layers including the adhesive layers bonding the packing material layers to each other. The composition of the layers is shown by way of example. Such a laminated foil has a gage of as little as 0.1 mm or slightly more, which means that the bridges 5 may be broken easily. It has been found that they are broken when the individual webs EB run across the forming shoulders of elements 10.

Figure 7:
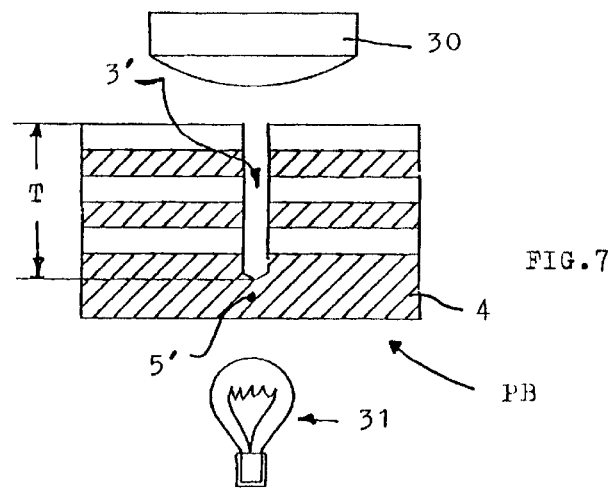
FIG. 7, in a view similar to FIG. 3, shows an embodiment of a control for the depth of the elongated slits.
Figure 8:
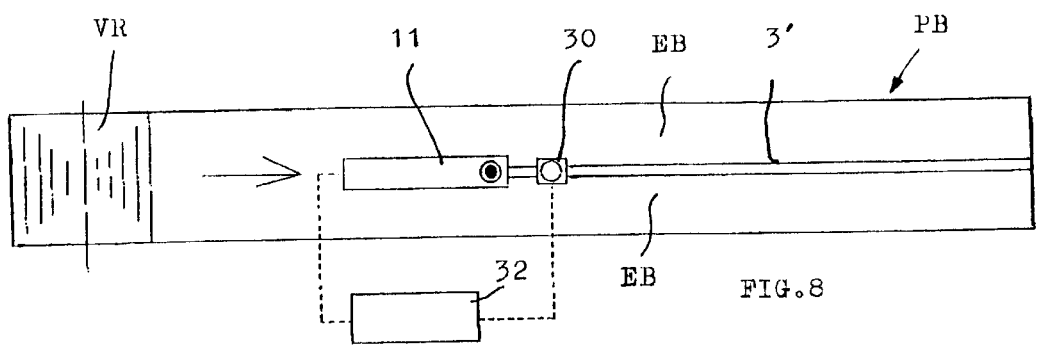
FIG. 8 is a top view of the web of packing material, with the depth control shown in FIG. 7.

However, as shown in FIGS. 7 and 8, in a preferred embodiment, individual webs EB remain joined not by spaced bridges 5 but the entire residue 5' of notched or scored remote web layer 4 joins the individual webs together. In other words, depth T of the laser cut slits 3' is permanently controlled along the entire length of web PB. The illustrated means for controlling lasers 11 to determine the depth of slits 3' comprises light source 31 at one side of multi-layered web of packing material PB for illuminating the web in the areas of laser-cut elongated slits 3', light sensor 30 at the opposite side of the web for sensing the light passing therethrough, and laser control 32 connected to the light sensor and responsive to the sensed light. If for whatever reason the depth of slit 3' changes, more or less light will pass through residue 5' of remote web layer 4, which will be sensed by light sensor 30 to adjust the laser control correspondingly and to restore the desired depth of the slit.

In this embodiment of the present invention, all web layers except for the remote web layer 4 are slit and the remote web layer is only notched or scored along the entire length of the web of packing material, and individual webs EB remain joined by residue 5' of remote web layer 4.

As gases inevitably arise in laser cutting, a gas absorber 12 is provided on the other side of the web of packing material PB. The web guiding elements contained in the sterile chamber 7 shown in FIG. 1 comprise a pair of feeding rollers 13, a blade 14 for removing the sterilizing agent, a so-called web looping lever 15 and a web edge control 16. The design of the sterilization station 6 in the form of a sterilizing agent bath for passage of the web of packing sheet PB is optional, i.e. it may also be a vaporizing or radiation chamber.

In the process of converting the multi-layered web of packing sheet PB of a suitably dimensioned width to be aseptically processed in a packaging machine into a plurality of individual webs EB of equal width, the individual webs are fed conventionally over a corresponding number of forming shoulders of elements 10, to the forming and loading station 2 of the packaging machine where, in a plurality of strips, they are simultaneously shaped into individual packages EP that are filled, sealed and singled.

However, according to the invention, it is important that the elongated slits 3 be cut by controlled lasers 11 into the wide, multi-layered web of packing material PB at a distance corresponding to the width B of the individual webs EB before the web enters the sterilization chamber 6, with such cuts penetrating all layers. However, the layer 4 of the web of packing material PB disposed away from the laser and forming the inner side on the individual packages EP is only notched. It may also be completely slit and scored only at selected distances to form bridges 5, as shown in FIGS. 2 and 3. After sterilization in the sterilizing bath 6 and during their being advanced in a sterile atmosphere, the individual webs EB still joined together are fed to a corresponding number of tube-shaping elements 1, which automatically results in breaking the scored layer 4 when the individual webs EB are transformed into tubular shape. The lengthwise sealing of the individual webs EB transformed into tubes on the forming pipe is then effected in the conventional way by longitudinal sealing jaws 17 during the timed withdrawal of the sealed tubes by transverse sealing jaws 18.

In the embodiment illustrated in FIGS. 4 and 5, identical reference numerals are used for operating in a like manner as hereinabove described. In this advantageous embodiment, the web of packing material PB formed of individual webs EB still joined together by scored layer 4, in a sterile atmosphere and prior to their being advanced to the tube-shaping elements 1, is subjected to a web edge control for centering the individual webs EB in relation to their tube-shaping element 1. The web of packing material PB may be subjected to a web edge control prior to being laser-cut into individual webs EB.

The web edge control elements arranged for this purpose ahead of tube-forming elements 1 are designated by reference numeral 16. The adjusting elements 19 for the actual web guiding elements 20 of web edge control elements 16 contained in the sterile chamber 7 are arranged outside the sterile chamber 7, and the optoelectronic edge sensors 21 are provided outside the sterile chamber 7 on one or two view windows 22 of the sterile chamber 7 defined by sterile tunnel 7'. The edge sensors 21, of which only two are required because only the marginal edges of the two outer individual webs EB' need be sensed, are schematically shown in FIG. 5 although they do not form part of the actual web guiding elements 20 controllably pivoted about a vertical axis 20' in the sterile chamber.

As shown in FIG. 4, like web edge control elements 16' are located outside the sterile chamber 7, i.e. upstream of lasers 11.

Figure 6:
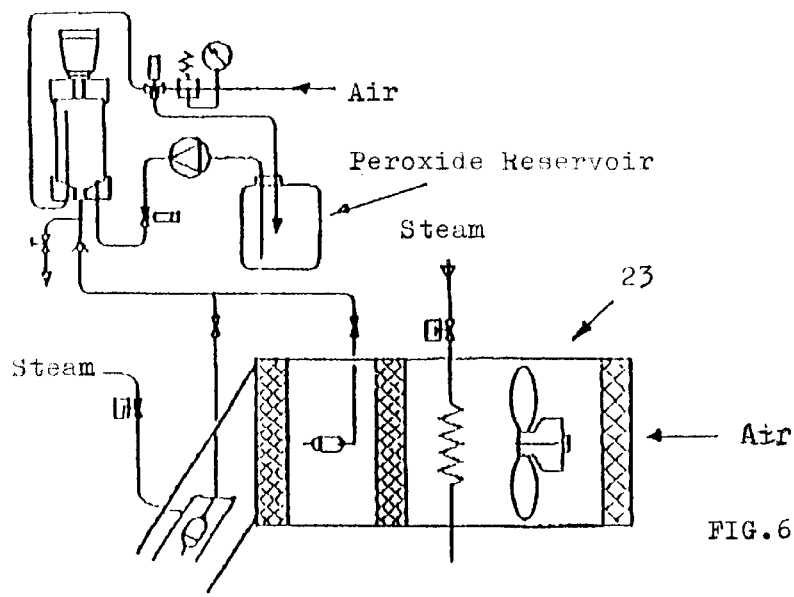
FIG. 6 schematically shows the elements for presterilizing the sterile chamber and keeping the same in sterile condition.

Reference numeral 23 designates a sterile air generator holding the sterile chamber 7 during operation of the machine at a slight excess pressure. For the sake of completeness, FIG. 6 shows the element s for pre-sterilization of the sterile chamber 7 prior to taking the machine into operation, which do not require any special description as they are conventional and do not form a part of the present invention, which is concerned with the laser-scoring of the wide multi-layered web for dividing it into individual strips.

What is claimed is:

1. A process of dividing an endless, wide multi-layered web of packing material having two sides into a plurality of individual webs of equal width, and aseptically processing the individual webs by supplying the webs to a forming and filling station of a tubular bag packaging machine where the individual webs are formed into individual packages, filled, sealed and singled, which comprises the steps of
    (a) laser-cutting elongated slits into the endless wide multi-layered web at a distance corresponding to the width of the individual webs to produce the individual webs, the laser-cutting being effectuated with a laser positioned at one of the sides of the multi-layered web and the slits extending through all layers of the web except for a web layer remote from the laser at the other side of the web, which is only notched at least at selected distances, whereby the notched remote web layer holds the individual webs together,
    (b) then sterilizing the laser-cut multi-layered web in a sterilization station, and (c) conveying the sterilized, laser-cut multi-layered web in a sterile chamber to a number of tube-shaping and filling elements corresponding to the number of individual webs, the notched remote web layer being torn by the tube-shaping elements to separate the individual webs from each other.

2. The process of claim 1, wherein the remote web layer is only notched along the entire length of the multi-layered web.

3. The process of claim 2, comprising the step of permanently controlling the depth of the laser-cut elongated slits by illuminating the area where the slits are laser-cut, sensing the light passing through the notched remote web layer, and controlling the lasers in response to the sensed light.

4. The process of claim 1, wherein the remote web layer is only notched only at selected distances along the length of the multi-layered web to provide readily breakable bridges holding the individual webs together at said distances while the elongated slits extend through the remote web layer between the readily breakable bridges.

5. The process of claim 1, comprising the step of subjecting the laser-cut multi-layered web in the sterile chamber to a web edge control upstream of the tube-shaping elements to center the individual webs in relation thereto.

6. The process of claim 5, comprising the step of subjecting the multi-layered web to a web edge control before the elongated slits are laser-cut into the web.

7. A tubular bag packaging machine for aseptically processing individual webs of a packing material by forming the individual webs into individual packages in a forming and filling station, where they are filled, sealed and singled in a sterile chamber, the forming and filling station including a number of tube-shaping and filling elements corresponding to the number of individual webs, which comprises:

(a) a supply reel of an endless, wide multi-layered web of packing material, (b) a sterilization station arranged upstream of the forming and filling station for sterilizing the web of packing material, and (c) a conveyance path along which the endless, wide multi-layered web of packing material is conveyed from the supply reel to the sterilization station, a number of lasers corresponding to the number of tube-shaping elements minus one being arranged in the conveyance path for cutting elongated slits into the multi-layered web of packing material to divide the web into the individual webs, and (d) means for controlling the lasers to determine the depth of the slits and for controlling the lasers to cut the slits extending through all layers of the web except for a web layer remote from the laser, which is only notched, whereby the notched remote web layer holds the individual webs together.

8. The packaging machine of claim 7, wherein the means for controlling the lasers to determine the depth of the slits comprises light sources at one side of the multi-layered web of packing material for illuminating the web in the areas of the laser-cut elongated slits, light sensors at the opposite side of the web for sensing the light passing therethrough, and a laser control responsive to the sensed light.

9. The packaging machine of claim 8, wherein the means for controlling the lasers is adapted to cause the lasers only to notch the remote web layer along the entire length of the multi-layered web.

10. The packaging machine of claim 7, further comprising adjustable web edge control means arranged in the sterile chamber downstream of the tube-shaping elements to center the individual webs in relation thereto.

11. The packaging machine of claim 9, comprising means arranged outside the sterile chamber for adjusting the web edge control means, and optoelectronic edge sensors mounted outside the sterile chamber on viewing windows.

12. The packaging machine of claim 9, further comprising a web edge control means arranged in the conveyance path downstream of the lasers.

13. The packaging machine of claim 7, wherein the means for controlling the lasers is adapted to cause the lasers only to notch the remote web layer at selected distances along the length of the multi-layered web to provide readily breakable bridges at said distances while the elongated slits extend through the remote web layer between the readily breakable bridges holding the individual webs together.

* * * * *